US012753310B2

(12) United States Patent
Chung et al.

(10) Patent No.: US 12,753,310 B2
(45) Date of Patent: Oct. 6, 2026

(54) POLYAMIDE RESIN COMPOSITION FOR STRUT SYSTEM STRIKER CAP

(71) Applicants: HYUNDAI MOTOR COMPANY, Seoul (KR); KIA CORPORATION, Seoul (KR); KOLON PLASTICS, INC., Gimcheon-si (KR)

(72) Inventors: Mingyun Chung, Yongin-si (KR); Seonghyeon Myeong, Gimcheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 775 days.

(21) Appl. No.: 18/207,976

(22) Filed: Jun. 9, 2023

(65) Prior Publication Data

US 2024/0076492 A1 Mar. 7, 2024

(30) Foreign Application Priority Data

Sep. 6, 2022 (KR) ........................ 10-2022-0112725

(51) Int. Cl.

*C08L 77/10* (2006.01)
*C08K 3/04* (2006.01)
*C08K 3/36* (2006.01)
*C08K 7/14* (2006.01)

(52) U.S. Cl.

CPC ................ *C08L 77/10* (2013.01); *C08K 3/04* (2013.01); *C08K 3/36* (2013.01); *C08K 7/14* (2013.01); *C08K 2201/003* (2013.01); *C08L 2205/03* (2013.01)

(58) Field of Classification Search

CPC .......... C08L 77/02; C08L 23/08; C08L 23/12; C08K 7/14

See application file for complete search history.

(56) References Cited

U.S. PATENT DOCUMENTS

| | | | | |
|---|---|---|---|---|
| 5,296,539 | A | 3/1994 | Ghidoni et al. | |
| 11,254,089 | B2 | 2/2022 | Seppi | |
| 2011/0269891 | A1 * | 11/2011 | Jain .......................... | C08K 3/36 977/773 |
| 2021/0009768 | A1 | 1/2021 | Rerat et al. | |

FOREIGN PATENT DOCUMENTS

| | | | | | |
|---|---|---|---|---|---|
| CN | 103242649 | A | | 8/2013 | |
| CN | 103421309 | A | | 12/2013 | |
| CN | 109504081 | A | * | 3/2019 | .............. C08L 77/02 |
| CN | 110684342 | A | | 1/2020 | |
| CN | 112552676 | A | * | 3/2021 | .............. C08L 77/02 |
| CN | 115028991 | A | * | 9/2022 | .............. C08L 23/12 |
| JP | H05-98119 | A | | 4/1993 | |
| JP | 2020-500777 | A | | 1/2020 | |
| KR | 2021-0018795 | A | | 2/2021 | |

* cited by examiner

*Primary Examiner* — Mark S Kaucher

(74) *Attorney, Agent, or Firm* — MCDONNELL BOEHNEN HULBERT & BERGHOFF LLP

(57) ABSTRACT

A polyamide resin composition for a striker cap of a strut system includes 40 to 60 wt % of a polyamide 6 resin, 10 to 20 wt % of glass fiber, 20 to 30 wt % of an ethylene-based copolymer, and 5 to 10 wt % of a polyolefin resin to obtain excellent impact strength, high heat deflection temperature, and reduced bothersome noise.

16 Claims, No Drawings

POLYAMIDE RESIN COMPOSITION FOR STRUT SYSTEM STRIKER CAP

CROSS REFERENCE TO RELATED APPLICATIONS

This application claims the benefit of priority to Korean Patent Application No. 10-2022-0112725, filed on Sep. 6, 2022 in the Korean Intellectual Property Office, the disclosure of which is incorporated herein by reference.

TECHNICAL FIELD

The present disclosure relates to a polyamide resin composition for strut system striker cap.

BACKGROUND

Friction is generated between a striker cap and a bump stopper of a strut system, and grease is applied thereto to reduce the friction, but the effect of grease rapidly decreases as mileage increases. Particularly a problem of bothersome noise increases after a shock absorber oil is adsorbed onto the surface thereof. Therefore, the need to improve physical properties of a material of the striker cap has been raised to reduce bothersome noise after the effect of grease decreases.

In addition, a problem of noise generation is caused when a striker cap is dislocated during a durability test in a high-temperature, high-humidity environment.

SUMMARY

An aspect of the disclosure is to provide a polyamide resin composition for strut system striker cap having improved impact strength, high heat deflection temperature, and reduced bothersome noise to reduce bothersome noise caused by a friction between a striker cap and a bump stopper and inhibit noise by preventing dislocation of the striker cap even in a high-temperature, high-humidity environment.

Additional aspects of the disclosure will be set forth in part in the description which follows and, in part, will be obvious from the description, or may be learned by practice of the disclosure.

In accordance with an aspect of the disclosure, a polyamide resin composition for strut system striker cap includes 40 to 60 wt % of a polyamide 6 resin, 10 to 20 wt % of glass fiber, 20 to 30 wt % of an ethylene-based copolymer, and 5 to 10 wt % of a polyolefin resin.

In addition, in a polyamide resin composition for strut system striker cap according to another embodiment of the present disclosure, a relative viscosity (RV) of the polyamide 6 resin may be from 2.2 to 3.5.

In addition, in a polyamide resin composition for strut system striker cap according to another embodiment of the present disclosure, a number average molecular weight of the polyamide 6 resin may be from 20,000 to 50,000.

In addition, in a polyamide resin composition for strut system striker cap according to another embodiment of the present disclosure, the glass fiber may be in the form of chopped strands and has a diameter of 9 to 15 m.

In addition, in a polyamide resin composition for strut system striker cap according to another embodiment of the present disclosure, a length of the glass fiber may be from 3 to 5 mm.

In addition, in a polyamide resin composition for strut system striker cap according to another embodiment of the present disclosure, the ethylene-based copolymer may include a maleic anhydride-grafted ethylene-octene random block copolymer, and a grafting rate of the maleic anhydride may be from 0.5 to 6.0 parts by weight based on 100 parts by weight of ethylene.

In addition, in a polyamide resin composition for strut system striker cap according to another embodiment of the present disclosure, the polyolefin resin may include a resin, non-grafted with maleic anhydride, selected from low-density polyethylene, high-density polyethylene, homo polypropylene, and random polypropylene.

In addition, in a polyamide resin composition for strut system striker cap according to another embodiment of the present disclosure, the polyolefin resin may include low-density polyethylene non-grafted with maleic anhydride.

In addition, a polyamide resin composition for strut system striker cap according to another embodiment of the present disclosure may further include an additive, wherein the additive includes at least one selected from an antioxidant, a release agent, a nucleator, and a colorant.

In addition, in a polyamide resin composition for strut system striker cap according to another embodiment of the present disclosure, the antioxidant may include at least one selected from a phenol type, a phosphite type, a thioether type, and an amine type.

In addition, in a polyamide resin composition for strut system striker cap according to another embodiment of the present disclosure, the release agent may include at least one selected from a fluorine-containing polymer, silicone oil, a metal salt of stearic acid, a metal salt of montanic acid, a polyethylene wax, and a montanic acid ester wax.

In addition, in a polyamide resin composition for strut system striker cap according to another embodiment of the present disclosure, the nucleator may include at least one selected from wollastonite, talc, mica, silica, and clay.

In addition, in a polyamide resin composition for strut system striker cap according to another embodiment of the present disclosure, the colorant may include at least one selected from carbon black and nigrosine.

In addition, in a polyamide resin composition for strut system striker cap according to another embodiment of the present disclosure, an IZOD notched impact strength may be 30 kJ/$m^2$ or more.

In addition, in a polyamide resin composition for strut system striker cap according to another embodiment of the present disclosure, a heat deflection temperature (HDT) may be 130° C. or higher.

In addition, in a polyamide resin composition for strut system striker cap according to another embodiment of the present disclosure, squeak noise Stick-slip evaluation results to evaluate bothersome noise may be Grades 1 to 3.

DETAILED DESCRIPTION

Reference will now be made in detail to the embodiments of the disclosure, examples of which are illustrated in the accompanying drawings, wherein like reference numerals refer to like elements throughout. However, the present disclosure may be embodied in many different forms and should not be construed as being limited to the embodiments set forth herein. Rather, these embodiments are provided so that this disclosure will be thorough and complete, and will fully convey the scope of the disclosure to those skilled in the art.

The terms used herein are merely used to describe particular embodiments. Thus, an expression used in the singular encompasses the expression of the plural, unless it has a clearly different meaning in the context. In addition, it is to be understood that the terms such as “including” or “having” are intended to indicate the existence of features, steps, functions, components, or combinations thereof disclosed in the specification, and are not intended to preclude the possibility that one or more other features, steps, functions, components, or combinations thereof may exist or may be added.

Meanwhile, unless otherwise defined, all terms used herein have the same meaning as those commonly understood by one of ordinary skill in the art to which this disclosure belongs. Thus, these terms should not be interpreted in an idealized or overly formal sense unless expressly so defined herein. As used herein, the singular forms are intended to include the plural forms as well, unless the context clearly indicates otherwise.

In addition, the terms “about”, “substantially”, etc. used throughout the specification mean that when a natural manufacturing and substance allowable error are suggested, such an allowable error corresponds a value or is similar to the value, and such values are intended for the sake of clear understanding of the present disclosure or to prevent an unconscious infringer from illegally using the disclosure of the present disclosure. The embodiments described in the specification and shown in the drawings are only illustrative and are not intended to represent all aspects of the disclosure, such that various modifications may be made without departing from the spirit of the disclosure.

In addition, the terms used in the present disclosure are merely used to describe embodiments and are not intended to limit the present disclosure. An expression used in the singular encompasses the expression of the plural, unless it has a clearly different meaning in the context.

Also, an order of operations performed by the methods according to the disclosure may be changed unless there is a particular description about the order of operations.

Hereinafter, a polyamide resin composition for strut system striker cap according to an embodiment of the present disclosure will be described in detail.

A polyamide resin composition for strut system striker cap according to an embodiment of the present disclosure includes 40 to 60 wt % of a polyamide 6 resin, 10 to 20 wt % of glass fiber, 20 to 30 wt % of an ethylene-based copolymer, and 5 to 10 wt % of a polyolefin resin.

Specifically, the polyamide resin composition for strut system striker cap according to an embodiment of the present disclosure may include 40 to 60 wt % of the polyamide 6 (Polyamide 6) resin having excellent heat resistance and mechanical strength, 10 to 20 wt % of glass fiber in the form of chopped strands to increase impact strength and heat deflection temperature, 20 to 30 wt % of the ethylene-based copolymer to reduce bothersome noise, 5 to 10 wt % of the polyolefin resin, and at least one type of additives according to required properties.

1) Polyamide 6 Resin

The polyamide resin composition for strut system striker cap according to an embodiment of the present disclosure includes 40 to 60 wt % of the polyamide 6 resin.

In addition, in the polyamide resin composition for strut system striker cap according to an embodiment of the present disclosure, a relative viscosity (RV) of the polyamide 6 resin contained may be from 2.2 to 3.5 (solution prepared by adding 1 g of the polyamide 6 resin to 100 ml of 96% sulfuric acid at 20° C.). With the viscosity of the polyamide 6 resin less than 2.2, stiffness, impact strength, and heat resistance deteriorate. With the viscosity exceeding 3.5, excessive frictional heat is generated between a screw and a resin in a molding machine, the resin may be decomposed, or a high pressure is required to mold the resin causing overloads on the molding machine and a mold making it difficult to perform injection molding.

In addition, in the polyamide 6 resin of the polyamide resin composition for strut system striker cap according to an embodiment of the present disclosure, a number average molecular weight may be from 20000 to 50000. With the number average molecular weight less than 20000, stiffness may deteriorate, and with the number average molecular weight exceeding 50000, flowability decreases due to high viscosity causing a problem in melt kneading.

In addition, in the case of using the polyamide 66 resin, a processing temperature is higher than that of the polyamide 6 resin by 20 to 50° C., and thus the additive may be decomposed resulting in deterioration in physical properties, causing limits to reduce bothersome noise, and reducing production yield during manufacturing. Meanwhile, the polyamide 6 resin of the present disclosure may be manufactured in the form of chips and used after being sufficiently dried in a dehumidifying dryer.

2) Glass Fiber

The polyamide resin composition for strut system striker cap according to an embodiment of the present disclosure includes 10 to 20 wt % of glass fiber. With the content of glass fiber less than 10 wt %, the effect on increasing heat deflection temperature may be negligible. With the content of glass fiber exceeding 20 wt %, the effect on reducing bothersome noise may be negligible and processibilty may decrease due to an increase in loads during extrusion.

In addition, in the polyamide resin composition for strut system striker cap according to an embodiment of the present disclosure, the glass fiber may be in the form of chopped strands and have a diameter of 9 to 15 m. With the diameter of glass fiber less than 9 m, glass fiber easily breaks to be insufficient to improve stiffness, and with the diameter of glass fiber exceeding 15 m, excellent appearance quality cannot be obtained due to deterioration in physical properties caused by decreased surface area and protrusions on the surface.

In addition, in the polyamide resin composition for strut system striker cap according to an embodiment of the present disclosure, a length of glass fiber may be from 3 to 5 mm. When the length of the glass fiber is less than 3 mm, stiffness cannot be sufficiently improved due to a short length of glass fiber. When the length of the glass fiber exceeds 5 mm, stiffness is improved but glass fiber protrudes from the surface failing to obtain excellent appearance quality. The surface may be treated with a coupling agent, and additionally, a silane-based coupling agent may be added thereto.

3) Ethylene-Based Copolymer

The polyamide resin composition for strut system striker cap according to an embodiment of the present disclosure includes 20 to 30 wt % of the ethylene-based copolymer. With the content of the ethylene-based copolymer less than 20 wt %, bothersome noise cannot be sufficiently reduced but remains. With the content of the ethylene-based copolymer exceeding 30 wt %, flowability may be excessively reduced to cause deterioration in productivity during extrusion and non-formation or gas generation during injection molding.

In addition, in the polyamide resin composition for strut system striker cap according to an embodiment of the present disclosure, the ethylene-based copolymer may be a maleic anhydride-grafted ethylene-octene random block copolymer, and a grafting rate of the maleic anhydride may be from 0.5 to 6.0 parts by weight based on 100 parts by weight of ethylene. At the grafting ratio of maleic anhydride less than 0.5 based on 100 parts by weight of ethylene, reactivity with the polyamide resin decreases failing to obtain sufficient mechanical properties. At the grafting ratio of maleic anhydride exceeding 6.0 based on 100 parts by weight of ethylene, viscosity may excessively increase to cause a problem in injection molding processability.

4) Polyolefin Resin

The polyamide resin composition for strut system striker cap according to an embodiment of the present disclosure includes 5 to 10 wt % of the polyolefin resin. With the content of the polyolefin resin less than 5 wt %, bothersome noise cannot be sufficiently reduced but remains. With the content of the polyolefin resin exceeding 10 wt %, heat deflection temperature cannot be satisfied, and flowability may be excessively reduced to cause deterioration in productivity during extrusion and non-formation or gas generation during injection molding.

In addition, in the polyamide resin composition for strut system striker cap according to an embodiment of the present disclosure, the polyolefin resin may include at least a resin, which is not grafted with maleic anhydride, selected from low-density polyethylene, high-density polyethylene, homo polypropylene, and random polypropylene, or preferably include low-density polyethylene, which is not grafted with maleic anhydride.

5) Additive

The polyamide resin composition for strut system striker cap according to an embodiment of the present disclosure may further include an additive according to required properties, and the additive may include at least one selected from an antioxidant, a release agent, a nucleator, and a colorant.

In addition, in the polyamide resin composition for strut system striker cap according to an embodiment of the present disclosure, the antioxidant may include at least one selected from a phenol type, a phosphite type, a thioether type, and an amine type.

In addition, in the polyamide resin composition for strut system striker cap according to an embodiment of the present disclosure, the release agent may include at least one selected from a fluorine-containing polymer, silicone oil, a metal salt of stearic acid, a metal salt of montanic acid, a polyethylene wax and a montanic acid ester wax.

In addition, in the polyamide resin composition for strut system striker cap according to an embodiment of the present disclosure, the nucleator may include at least one selected from wollastonite, talc, mica, silica, and clay.

In addition, the polyamide resin composition for strut system striker cap according to an embodiment of the present disclosure, the colorant may include at least one selected from carbon black, and nigrosine.

As described above, the polyamide resin composition for strut system striker cap according to the present disclosure may have impact strength and heat deflection temperature required for products simultaneously reducing bothersome noise by including the polyamide 6 resin, the glass fiber, the ethylene-based copolymer, the polyolefin resin, and the additive.

Specifically, in the polyamide resin composition for strut system striker cap according to the present disclosure, an IZOD notched impact strength, measured according to ISO 180 standards, may be 30 kJ/$m^2$ or more. When the impact strength is less than 30 kJ/$m^2$, a shock absorber rod may break during assembling, and thus the impact strength may be 30 kJ/$m^2$ or more.

In addition, in the polyamide resin composition for strut system striker cap according to the present disclosure, a heat deflection temperature (HDT), measured according to ISO 75/B standards (0.45 MPa), may be 130° C. higher. When the heat deflection temperature is below 130° C., an actual measurement result of maximum temperature of a shock absorber rod is not satisfactory in consideration of safety factor, and thus the heat deflection temperature may be 130° C. or higher.

In addition, the results of squeak noise stick-slip evaluation to evaluate bothersome noise characteristics are Grade 1 to 3, indicating great effects on reducing bothersome noise.

Preparation Method

The polyamide resin composition for strut system striker cap according to the present disclosure may be prepared by extruding the above-described elements, i.e., the polyamide 6 resin, the glass fiber, the ethylene-based copolymer, the polyolefin resin, and the additive, in an extruder. Specifically, the polyamide resin composition may be prepared by kneading the above-described elements of the polyamide resin composition using a twin-screw extruder at a temperature of 250° C. to 280° C. In this case, in order to maximize kneadability and uniformity of the polyamide resin composition, an extruder including 4 inlets may be used, i.e., the polyamide 6 resin may be added to a first inlet, the additive may be added to a second inlet, the ethylene-based copolymer and the polyolefin resin may be added to a third inlet, and the glass fiber may be added to a fourth inlet. In addition, in order to prevent thermal decomposition of the polyamide resin composition during a melt-kneading process, a residence time may be minimized. In consideration of dispersity of the polyamide resin composition, rotation of the screw may be adjusted in the range of 300 to 500 rpm. When the kneading temperature is below 250° C., the polyamide resin composition may not be sufficiently molten. When the kneading temperature is higher than 280° C., decomposition may cause deterioration in physical properties and characteristics. Therefore, the kneading temperature may be controlled in the range of 250° C. to 280° C.

Hereinafter, the present disclosure will be described in more detail through examples. However, it is necessary to note that the following examples are only intended to illustrate the present disclosure in more detail and are not intended to limit the scope of the present disclosure. This is because the scope of the present disclosure is determined by matters described in the claims and able to be reasonably inferred therefrom.

EXAMPLES

Polyamide 6 resin: Domamid 27 (Domo Inc.)
Polyamide 66 resin: 50 BW (Ascend)
Glass fiber: GF 311 (KCC Corporation)
Ethylene-based copolymer: Fusabond N493 (Dupont Inc.)
LDPE: MB9500 (LG Chem, Ltd.)
HDPE: HDPE 7220 (SK Inc.)
HOMO-PP: HOMO PP H360F (SK Inc.)
Carbon black: K003 (NPK Co., Ltd.)

Examples and comparative examples were prepared using the compounds in the composition ratios shown in Table 1 below.

Example 1

53 wt % of a polyamide 6 resin, 15 wt % of glass fiber, 23 wt % of an ethylene-based copolymer, 7 wt % of a low-density polyethylene, and 2 wt % of a carbon black master batch to realize black color were melt-kneaded at a composition ratio shown in Table 1 below in a twin-screw extruder heated to a temperature of 250 to 280° C. to prepare a polyamide resin composition. The composition was processed in the form of chips and dried at 100° C. for 4 hours using a dehumidifying dryer, and a specimen including the polyamide resin composition was prepared using a screw-type injection molding machine at the same temperature as that of the melt-kneading process.

Examples 2 to 5

In comparison with Example 1, specimens were prepared in the same manner as in Example 1, except that the contents of the polyamide 6 resin, the ethylene-based copolymer, and the density polyethylene were varied within allowable ranges and the content of the glass fiber was controlled to be the same as that of Example 1.

Examples 6 and 7

In comparison with Example 1, specimens were prepared in the same manner as in Example 1, except that the content of glass fiber was varied within an allowable range and the contents of the polyamide 6 resin and the ethylene-based copolymer were varied within allowable ranges.

Examples 8 and 9

In comparison with Example 1, specimens were prepared in the same manner as in Example 1, except that high-density polyethylene and homo polypropylene were used instead of the low-density polyethylene and the contents thereof were adjusted within allowable ranges.

Comparative Examples 1 and 2

In comparison with Example 1, specimens were prepared in the same manner as in Example 1, except that the low-density polyethylene was not contained in Comparative Example 1, and the low-density polyethylene was not contained and the contents of the polyamide 6 resin and the ethylene-based copolymer were adjusted in allowable ranges in Comparative Example 2.

Comparative Examples 3 to 5

In comparison with Example 1, specimens were prepared in the same manner as in Example 1, except that the contents of the ethylene-based copolymer and the low-density polyethylene were out of allowable ranges.

Comparative Examples 6 and 7

In comparison with Example 1, specimens were prepared in the same manner as in Example 1, except that the content of the glass fiber was out of an allowable range.

Comparative Example 8

In comparison with Example 1, a specimen was prepared in the same manner as in Example 1, except that glass fiber was not contained.

Comparative Example 9

In comparison with Example 1, a polyamide resin composition was prepared by melt-kneading using the polyamide 66 resin, instead of the polyamide 6 resin, in a twin-screw extruder heated to a temperature of 280 to 300° C. The composition was processed in the form of chips and dried at 100° C. for 4 hours using a dehumidifying dryer, and a specimen including the polyamide resin composition was prepared using a screw-type injection molding machine at the same temperature as that of the melt-kneading process.

Comparative Example 10

In comparison with Example 1, a specimen was prepared in the same manner as in Example 1, except that the low-density polyethylene was a polyolefin resin treated with maleic anhydride (MAH-grafted).

Measurement of Physical Properties (1) RPN: For squeak noise stick-slip evaluation to evaluate bothersome noise characteristics, the degree of risk of friction bothersome noise (risk priority number (RPN) index) was evaluated using a Ziegler instrument and the results are shown in Table 1 below.

Measurement Device: SSP-04 (Ziegler instruments)

Measurement Conditions: average grade of 3 cycles of moving 20 mm each in the left and right directions per each load (speed) fixed at 1 mm/sec (load) measured with loads of 40 N and 60 N at each cycle Specimen for Measurement: The test was performed after applying a small amount of a shock absorber oil to the surface of each specimen.

(moving axis) polyamide specimen, 60×60 mm, thickness: 2 mm (fixed axis) urethane foam specimen (SJBH, SKC Co., Ltd.), 50×30 mm, thickness: 10 mm Measurement Results: An average of measurement results of 3 cycles was calculated. The results were calculated on a scale of 1 to 10. Grades 1 to 3 indicate excellent noise characteristics, and Grade 4 to 10 indicate poorer noise characteristics as the number increases.

(2) Impact Strength: IZOD notched impact strength was measured according to ISO 180 standards and shown in Table 1 below.

(3) Heat deflection temperature: measured according to the ISO 75/B (0.45 MPa) standards and shown in Table 1 below.

TABLE 1

| wt % | polyamide 6 resin | polyamide 66 resin | Glass fiber | ethylene-based copolymer (MAH treated) | LDPE (MAH treated) | LDPE | HDPE | Homo-PP | carbon black | impact strength (KJ/m$^2$) | heat deflection temperature (° C.) | RPN grade (40N) | RPN grade (60N) |
|---|---|---|---|---|---|---|---|---|---|---|---|---|---|
| Example 1 | 53 | — | 15 | 23 | | 7 | | | 2 | 43.3 | 195.5 | 1 | 1 |
| Example 2 | 58 | — | 15 | 20 | | 5 | | | 2 | 36.7 | 197.6 | 1 | 2 |
| Example 3 | 53 | — | 15 | 25 | | 5 | | | 2 | 45.8 | 194.8 | 1 | 2 |

TABLE 1-continued

| wt % | polyamide 6 resin | polyamide 66 resin | Glass fiber | ethylene-based copolymer (MAH treated) | LDPE (MAH treated) | LDPE | HDPE | Homo-PP | carbon black | impact strength (KJ/m$^2$) | heat deflection temperature (° C.) | RPN grade (40N) | RPN grade (60N) |
|---|---|---|---|---|---|---|---|---|---|---|---|---|---|
| Example 4 | 53 | — | 15 | 20 | | 10 | | | 2 | 35.1 | 187.5 | 2 | 2 |
| Example 5 | 47 | — | 15 | 28 | | 8 | | | 2 | 50.7 | 184.1 | 1 | 1 |
| Example 6 | 56 | — | 12 | 23 | | 7 | | | 2 | 33.8 | 172.3 | 1 | 1 |
| Example 7 | 47 | — | 18 | 28 | | 5 | | | 2 | 52.8 | 199.8 | 1 | 2 |
| Example 8 | 53 | — | 15 | 23 | | | 7 | | 2 | 42.5 | 195.6 | 1 | 2 |
| Example 9 | 53 | — | 15 | 23 | | | | 7 | 2 | 38.8 | 196.8 | 1 | 2 |
| Comparative Example 1 | 53 | — | 15 | 30 | | | | | 2 | 52.5 | 193.3 | 4 | 6 |
| Comparative Example 2 | 68 | — | 15 | 15 | | | | | 2 | 29.0 | 200.3 | 10 | 10 |
| Comparative Example 3 | 63 | — | 15 | 15 | | 5 | | | 2 | 26.8 | 197.8 | 9 | 10 |
| Comparative Example 4 | 58 | — | 15 | 5 | | 20 | | | 2 | 13.3 | 135.5 | 9 | 10 |
| Comparative Example 5 | 63 | — | 15 | 10 | | 10 | | | 2 | 23.3 | 191.5 | 8 | 9 |
| Comparative Example 6 | 47 | — | 25 | 20 | | 5 | | | 2 | 53.1 | 209.8 | 5 | 8 |
| Comparative Example 7 | 66 | — | 7 | 20 | | 5 | | | 2 | 32.8 | 106.6 | 2 | 2 |
| Comparative Example 8 | 58 | — | 0 | 30 | | 10 | | | 2 | No break | 60.5 | 1 | 1 |
| Comparative Example 9 | | 53 | 15 | 25 | | 5 | | | 2 | 27.5 | 235.6 | 6 | 8 |
| Comparative Example 10 | 53 | — | 15 | 23 | 7 | | | | 2 | 36.8 | 197.3 | 3 | 3 |

As shown in Table 1, it was confirmed that the evaluation results of impact strength, heat deflection temperature, and bothersome noise characteristics (PN index) of Examples 1 to 9 satisfied the ranges of the present disclosure, indicating excellent impact strength, high heat deflection temperature, and reduced bothersome noise.

On the contrary, it was confirmed that poor bothersome noise characteristics were obtained in Comparative Examples 1 and 2, in which the polyolefin resin non-grafted with maleic anhydride was not contained, because the RPN index exceeded Grade 3, and it was also confirmed that impact strength deteriorated in the case where the content of the ethylene-based copolymer was low.

In addition, it was confirmed that poor impact strength and bothersome noise characteristics were obtained in Comparative Examples 3 to 5 because the content of the ethylene-based copolymer was less than 20 wt %, and in Comparative Example 4 because the content of the low-density polyethylene non-grafted with maleic anhydride exceeded 10 wt %.

Furthermore, it was confirmed that poor heat deflection temperature and bothersome noise characteristics were obtained in Comparative Example 6 because the content of the glass fiber exceeded 20 wt % and in Comparative Example 7 because the content of the glass fiber was less than 10 wt %, and it was also confirmed that thermal stability decreased in Comparative Example 8, which did not include glass fiber, due to too low heat deflection temperature.

In addition, it was confirmed that surface defects, poor impact strength and bothersome noise characteristics were poor in Comparative Example 9 because the polyamide 66 resin was used instead of the polyamide 6 resin, and the ethylene-based copolymer and low-density polyethylene having low thermal stability were decomposed while being melt-kneaded in the twin screw extruder heated to the temperature of 280 to 300° C.

Furthermore, it was confirmed that poor bothersome noise characteristics were obtained in Comparative Example 10 because the MAH-grafted low-density polyethylene was used and the RPN index exceeded Grade 3.

EXPERIMENTAL EXAMPLE: RPN INDEX EVALUATION

As described above, the RPN index indicates relative grades on a scale of 1 to 10 and is represented by Formula (1) below about energy rate, impulse rate, and acceleration index. Grade 1 is the most advantageous to bothersome noise characteristic and Grade 10 is the most disadvantageous thereto. Using the polyamide 66 resin, which is a mass-produced material, evaluation was conducted at surface pressure conditions of 0.2, 0.4, and 0.6 MPa, and the evaluation results are shown in Table 2 below.

$$RPN=(2*Rating_{Energy\ rate}+Rating_{Impulse\ rate}+Rating_{Acceleration})/4 \quad \text{Formula (1):}$$

TABLE 2

| | Oil coating | 20N (0.2 MPa) 1 mm/s | 40N (0.4 MPa) 1 mm/s | 60N (0.6 MPa) 1 mm/s |
|---|---|---|---|---|
| Polyamide 66 resin | X | 3 | 3 | 4 |
| | ○ | 10 | 10 | 10 |

Referring to Table 2, bothersome noise increased in the case where the shock absorber oil was applied to the surface in the fields. It was also confirmed that bothersome noise increased from the RPN index Grades 3 and 4 to Grade 10 by applying oil.

A polyamide resin composition for strut system striker cap according to the present disclosure has excellent impact strength, high heat deflection temperature, and reduced bothersome noise.

Although embodiments of the disclosure have been shown and described, it would be appreciated by those having ordinary skill in the art that changes may be made in these embodiments without departing from the principles and spirit of the disclosure, the scope of which is defined in the claims and their equivalents.

The invention claimed is:

1. A polyamide resin composition for a striker cap of a strut system, the polyamide resin composition comprising 40 to 60 wt % of a polyamide 6 resin, 10 to 20 wt % of glass fiber, 20 to 30 wt % of an ethylene-based copolymer, and 5 to 10 wt % of a polyolefin resin.

2. The polyamide resin composition according to claim 1, wherein a relative viscosity (RV) of the polyamide 6 resin is from 2.2 to 3.5.

3. The polyamide resin composition according to claim 1, wherein a number average molecular weight of the polyamide 6 resin is from 20,000 to 50,000.

4. The polyamide resin composition according to claim 1, wherein the glass fiber is in the form of chopped strands and has a diameter of 9 to 15 m.

5. The polyamide resin composition according to claim 1, wherein a length of the glass fiber is from 3 to 5 mm.

6. The polyamide resin composition according to claim 1, wherein the ethylene-based copolymer comprises a maleic anhydride-grafted ethylene-octene random block copolymer, and a grafting rate of the maleic anhydride is from 0.5 to 6.0 parts by weight based on 100 parts by weight of ethylene.

7. The polyamide resin composition according to claim 1, wherein the polyolefin resin comprises a resin, non-grafted with maleic anhydride, selected from low-density polyethylene, high-density polyethylene, homo polypropylene, and random polypropylene.

8. The polyamide resin composition according to claim 1, wherein the polyolefin resin comprises low-density polyethylene non-grafted with maleic anhydride.

9. The polyamide resin composition according to claim 1, further comprising an additive, wherein the additive comprises at least one selected from an antioxidant, a release agent, a nucleator, and a colorant.

10. The polyamide resin composition according to claim 9, wherein the antioxidant comprises at least one selected from a phenol type, a phosphite type, a thioether type, and an amine type.

11. The polyamide resin composition according to claim 9, wherein the release agent comprises at least one selected from a fluorine-containing polymer, silicone oil, a metal salt of stearic acid, a metal salt of montanic acid, a polyethylene wax, and a montanic acid ester wax.

12. The polyamide resin composition according to claim 9, wherein the nucleator comprises at least one selected from wollastonite, talc, mica, silica, and clay.

13. The polyamide resin composition according to claim 9, wherein the colorant comprises at least one selected from carbon black and nigrosine.

14. The polyamide resin composition according to claim 1, wherein an IZOD notched impact strength is 30 $kJ/m^2$ or more.

15. The polyamide resin composition according to claim 1, wherein a heat deflection temperature (HDT) is 130° C. or higher.

16. The polyamide resin composition according to claim 1, wherein a risk priority number (RPN) index of Formula (1) is 3 or less, where Formula (1) is $$RPN=(2*Rating_{Energy\ rate}+Rating_{Impulse\ rate}+Rating_{Acceleration})/4.$$

* * * * *